United States Patent [19]
Oosedo et al.

[11] Patent Number: 5,543,212
[45] Date of Patent: Aug. 6, 1996

[54] PREPREGS COMPRISING A REINFORCING FIBER LAYER, A KNITTED FABRIC OF THERMOPLASTIC FIBERS AND A MATRIX RESIN

[75] Inventors: Hiroki Oosedo, Ehime-ken; Nobuyuki Odagiri, Matsuyama, both of Japan

[73] Assignee: Toray Industries, Inc., Japan

[21] Appl. No.: 339,599

[22] Filed: Nov. 14, 1994

[30]    Foreign Application Priority Data

Dec. 2, 1993  [JP]  Japan ..................... 5-302953

[51] Int. Cl.$^6$ .............................. D03D 3/00; B32B 5/02; B32B 7/00
[52] U.S. Cl. .................... 428/229; 428/233; 428/236; 428/253; 428/902
[58] Field of Search ..................... 428/229, 232, 428/253, 294, 236, 902

[56]               References Cited

U.S. PATENT DOCUMENTS

| | | | |
|---|---|---|---|
| 3,819,461 | 6/1974 | Saffadi | 161/58 |
| 4,883,700 | 11/1989 | Harpell et al. | 428/113 |
| 4,983,433 | 1/1991 | Shirasaki | 428/36.1 |

*Primary Examiner*—James Withers
*Attorney, Agent, or Firm*—Austin R. Miller

[57]                 ABSTRACT

The present invention relating to prepegs has the following constitution to achieve the above object. That is, a prepreg, comprising long reinforcing fibers [A], matrix resin [B] and a knitted fabric made from thermoplastic resin fibers [C], with the component [C] distributed near either or both of the surface layers. Moreover, the present invention relating to processes for production of prepregs has either of the following constitution to achieve the above object. That is, a process for preparing a prepreg, comprising the steps of impregnating long reinforcing fibers [A] with matrix resin [B], and bonding a knitted fabric made from thermoplastic resin fibers [C] onto one side or both sides of the intermediate product, or a process for preparing a prepreg, comprising the step of bonding matrix resin [B] formed as a film, a knitted fabric made from thermoplastic resin fibers [C] and long reinforcing fibers [A]. The prepregs of the present invention, therefore, are tacky and drapable, and the composite materials obtained by heating and forming the prepregs are high in heat resistance, and very high in impact resistance and inter-layer toughness. Furthermore, the prepregs are easy to produce and high in their latitude in availability of materials, this being industrially significant.

8 Claims, No Drawings

PREPREGS COMPRISING A REINFORCING FIBER LAYER, A KNITTED FABRIC OF THERMOPLASTIC FIBERS AND A MATRIX RESIN

BACKGROUND OF THE INVENTION

1. Field of the Invention

The present invention relates to prepregs used for preparing fiber reinforced plastics high in strength, elastic modulus, impact resistance and inter-layer toughness, and processes for their production.

2. Description of the Related Art

Fiber reinforced plastics as a kind of composite material are anisotropic materials with reinforcing fibers and a matrix resin as the essential components and their physical properties in the fiber direction are greatly different from those in the other directions.

In general, the strength and elastic modulus in the fiber direction are very high but those in the other directions are low. As a widely adopted method for producing a fiber reinforced plastic material, layers of a filmy precursor called a prepreg formed by impregnating reinforcing fibers with an uncured thermosetting resin are laminated, formed and cured to obtain the intended product. Hereinafter unless otherwise stated, the term "composite material" means a fiber reinforced plastic material obtained by laminating layers of a prepreg, and forming and hardening the laminate. When a composite material is obtained from a prepreg, a fabric obtained by weaving reinforcing fibers is used in the prepreg, or layers of a prepreg made of reinforcing fibers arranged unidirectionally are laminated with the reinforcing fiber directions crossed, for rendering the physical properties almost isotropic in the obtained product.

However, it is known that even if these techniques are adopted, the impact resistance and other properties of the composite material are not fundamentally improved by enhancement of the strength of the reinforcing fibers, since they are affected by inter-layer fracture. The inter-layer region of the composite material is that region in the vicinity of the interface between laminated layers of prepregs. This region has a low content of reinforcing fibers, and since the reinforcing fibers are differently oriented on both sides of the interface, fracture is liable to occur in the region. Especially a composite material with a thermosetting resin as the matrix resin is insufficient in impact resistance since the matrix resin is low in toughness. Furthermore, if a tensile load is applied onto a crossed laminate, inter-layer peeling often occurs at an end of the laminate, so the latitude in laminate composition is often limited. Various methods are proposed for the purpose of improving the physical properties in the directions other than the fiber direction, especially impact resistance and inter-layer toughness, and many techniques are proposed which use, at the inter-layer region, a material different from the matrix resin, for absorbing fracture energy.

U.S. Pat. No. 4,604,319 discloses location of a thermoplastic resin film between fiber reinforced prepreg layers to achieve higher impact resistance. However, in this case, the tackiness and drapability as advantages of a thermosetting resin are lost disadvantageously.

In U.S. Pat. No. 5,028,478, the inventors disclosed a matrix resin containing fine particles made of a resin. In particular, it was disclosed that the localized existence of fine resin particles in the surfaces of layers of a prepreg improved the impact resistance of the composite material while maintaining the tackiness and drapability of the prepreg. However, this technique also has a problem that it is not easy to obtain fine resin particles.

Furthermore, fine particles are liable to go into the reinforcing fibers, and the ingress of fine particles into the fibers lowers the physical properties of the composite material. Any attempt to avoid this complicates the prepreg production process. Japanese Patent Laid-Open No. 90-32843 discloses a technique for improving the inter-layer toughness of the composite material by sticking woven fabrics on the surfaces of fiber reinforced prepregs. In general, it is generally easier to form a resin into fibers than into particles, and this technique is more advantageous in this regard, but there is a limit in the production of a woven fabric, to the minimum areal weight achievable, and it is not possible to obtain an inter-layer material with a suitable areal weight. Japanese Patent laid-Open Nos. 90-32843, 92-292635, 92-292636, 92-292909, 92-325527, 92-325528, 92-32529 and 93-17603 disclose that the inter-layer toughness of the composite material can be improved by arranging thermoplastic resin fibers in a certain direction on the surfaces of fiber reinforced prepreg layers. However, the attempt to lower the areal weight of the thermoplastic resin fibers accompanies a disadvantage that the areal weight, i.e., toughening performance becomes non-uniform in the width direction of the prepreg. Moreover when reinforcing fibers arranged in one direction are used, arranging the thermoplastic resin fibers in parallel to the reinforcing fibers allows the thermoplastic resin fibers go into the reinforcing fibers, and so impair the physical properties of the composite material. Furthermore, in this case, the fibres located in the inter-layer region of the composite material have a influence on the inter-layer toughness of the composite material, but the fibers penetrated into the intra-layer region not, so that toughening effect is lower disadvantageously. These prior techniques have still respective disadvantages that the effect of improving impact resistance is insufficient and that impact resistance is improved at the sacrifice of other properties such as inter-laminar shear strength and handling convenience. Furthermore, compared to the conventional prepregs, these techniques have a common problem that the production process becomes complicated and difficult.

SUMMARY OF THE INVENTION

The object of the present invention is to present prepregs which can be used to produce composite materials excellent in strength, elastic modulus, impact resistance and inter-layer toughness, The another object of the present invention is to present processes for producing the prepregs simply and easily.

The present invention relating to prepregs has the following constitution to achieve the above object. That is, a prepreg, comprising long reinforcing fibers [A], matrix resin [B] and a knitted fabric made from thermoplastic resin fibers [C], with the component [C] distributed near either or both of the surface layers.

Moreover, the present invention relating to processes for production of prepregs has either of the following constitution to achieve the above object. That is, a process for preparing a prepreg, comprising the steps of impregnating long reinforcing fibers [A] with matrix resin [B], and bonding a knitted fabric made from thermoplastic resin fibers [C] onto one side or both sides of the intermediate product, or a process for preparing a prepreg, comprising the step of bonding matrix resin [B] formed as a film, a knitted fabric made from thermoplastic resin fibers [C] and long reinforcing fibers [A].

DESCRIPTION OF THE PREFERRED EMBODIMENTS

The present invention is specifically described below.

The component [A] of the present invention is long reinforcing fibers, and can be selected from various fibers, to be suitable for each application of the composite material prepared, for example, from carbon fibers, graphite fibers, aramid fibers, silicon carbide fibers, alumina fibers, boron fibers, tungsten carbide fibers, glass fibers, etc. It is also possible to use multiple kinds of these reinforcing fibers in combination.

Among these fibers, carbon fibers and graphite fibers are good in the present invention since they are good in specific strength and specific elastic modulus and greatly contribute to the reduction in weight. Any kind of carbon fiber and graphite fiber can be used for respective applications. High strength carbon fibers of 1.5% or more in tensile elongation are suitable for obtaining a composite material high in strength. High strength high elongation carbon fibers of 450 kgf/mm$^2$ or more in tensile strength and 1.7% or more in tensile elongation are more preferable, and high strength high elongation carbon fibers of 1.9% or more in tensile elongation are most suitable. The reinforcing fibers used in the present invention must be long, and should be preferably 5 cm or more in length. If the fibers are shorter than 5 cm, the strength of the reinforcing fibers cannot be sufficiently exhibited in the composite material. The carbon fibers and graphite fibers can be used also as a mixture with other reinforcing fibers.

The reinforcing fibers are not limited in form or arrangement, and those arranged in one direction, in random directions, formed as a sheet, mat or woven fabric, or braid can be used. Especially for an application requiring a high specific strength and a high specific elastic modulus, reinforcing fibers paralleled in one direction are most suitable, but those arranged as a woven fabric easy to handle are also suitable for the present invention.

The matrix resin used as the component [B] in the present invention is mainly composed of a resin which is cured by external energy such as heat, light or electron beam, to form an at least partially three-dimensionally cross-linked material. In particular, a thermosetting resin to be cured by heat is preferably used. The thermosetting resin especially suitable for the present invention is an epoxy resin, and it is generally used in combination with a curing agent and/or curing catalyst. In particular, an epoxy resin which is made from an amine, phenol or compound with a carbon-carbon double bond is preferable. The epoxy resin with an amine as a precursor can be selected from, but not limited to, various isomers of tetraglycidyl diaminodiphenylmethane, triglycidyl-p-aminophenol, triglycidyl-m-aminophenol and triglycidyl aminocresol. The epoxy resin with a phenol as the precursor can be selected from, but not limited to, bisphenol A type epoxy resin, bisphenol F type epoxy resin, bisphenol S type epoxy resin, phenol novolak type epoxy resin and cresol novolak type epoxy resin. The epoxy resin with a compound with a carbon-carbon double bond as a precursor can be selected from, but not limited to, alicyclic epoxy resins. Resins obtained by brominating these epoxy resin can also be used. An epoxy resin with an aromatic amine such as tetraglycidyl diaminodiphenylmethane is good in heat resistance and good in adhesiveness to the reinforcing fibers, so most suitable for the present invention. An epoxy resin can be preferably used in combination with an epoxy curing agent. The epoxy curing agent used can be any compound with an active group capable of reacting with an epoxy group. Preferably a compound with an amino group, acid anhydride group or amido group is suitable. It can be selected, for example, from dicyandiamide, various isomers of diaminodiphenylsulfone, and aminobenzoates. Specifically, dicyandiamide is preferably used since it is excellent in its ability to allow strage of the prepreg for a long time. Various isomers of diaminodiphenylsulfone are most suitable in the present invention since they make the cured material good in heat resistance. The aminobenzoates preferably used include trimethylene glycol di-p-aminobenzoate and neopentyl glycol di-p-aminobenzoate, and since they are more excellent in tensile elongation even though lower in heat resistance than diaminodiphenylsulfone, they are selectively used for particular applications.

The thermosetting resin used as the component [B] can be preferably selected from maleimide resins, resins with acetylene terminals, resins with nadic acid terminals, resins with cyanate terminals, resins with vinyl terminals and resins with allyl terminals. Any of these resins can also be mixed with an epoxy resin or another resin.

A maleimide resin is a compound with an average of two or more maleimide groups per molecule. A bismaleimide prepared from diaminodiphenylmethane is especially preferably used. The maleimide compound can be selected, for example, from, but not limited to, N,N'-phenylene bismaleimide, N,N'-hexamethylene bismaleimide, N,N'-methylene-di-p-phenylene bismaleimide, N,N'-oxy-di-p-phenylene bismaleimide, N,N'-4,4'-benzophenone bismaleimide, N,N'-diphenylsulfone bismaleimide, N,N'-(3,3'-dimethyl)-methylene-di-p-phenylene bismaleimide, N,N'-4,4'-dicyclohexylmethane bismaleimide, N,N'-m(or p)-xylylenebismaleimide, N,N'-(3,3'-diethyl)methylenedi-p-phenylenebismaleimide, N,N'-m-tolylene-dimaleimide and bismaleimide of bis(aminophenoxy)benzene, and also the reaction product of maleic anhydride and a polyamine produced by reaction between aniline and formalin. Furthermore, two or more of these maleimide compounds can also be used as a mixture, and the maleimide compound used can also contain a monomaleimide compound such as N-allylmaleimide, N-propylmaleimide, N-hexylmaleimide or N-phenylmaleimide, etc.

The maleimide resin is preferably used in combination with a curing agent. The curing agent can be any compound with an active group capable of reacting with a maleimide group. Preferably a compound with amino group or an alkenyl group such as allyl group, benzocyclobutene group, allylnadimide group, isocyanate group, cyanate group or epoxy group is suitable. A typical curing agent with an amino group is diaminodiphenylmethane. Typical curing agents with an alkenyl group are 0,0'-diallylbisphenol A and bis(propenylphenoxy)sulfone.

A bismaleimide-triazine resin (BT resin) composed of any of the above bismaleimides and a cyanate is also suitable as a thermosetting resin used as the component [B] of the present invention. A preferable resin with cyanate terminals is a cyanate compound of a polyphenol such as bisphenol A. A mixed resin consisting of a cyanate resin and a bismaleimide resin is marketed as BT resin produced by Mitsubishi Gas Chemical Co., Inc. and is suitable for the present invention. These are generally better in heat resistance and water resistance than epoxy resins but are lower in toughness and impact resistance, and so are selectively used for particular applications. The ratio by weight of bismaleimide and cyanate is in a range from 0:100 to 70:30. A resin of 0:100 corresponds to a triazine resin, and this is also suitable for the present invention.

Furthermore, a thermosetting polyimide resin with reactive groups at the terminals is also suitable as the component [B] of the present invention. The reactive groups at the terminals are preferably nadiimide groups, acetylene groups or benzocyclobutene groups, etc.

The component [B] of the present invention can also be selected from thermosetting resins widely accepted in the industry such as phenol resin, resorcinol resin, unsaturated polyester resin, diallyl phthalate resin, urea resin and melamine resin.

The component [B] of the present invention can be modified with a thermoplastic resin such as polysulfone, inorganic fine particles such as fine silica particles, elastomer or a reactive diluent, etc., to such an extent that the heat resistance is not greatly lowered. In this case, the content of the ingredient other than the thermosetting resin should be preferably within 35 wt %. The component [C] is a knitted fabric made from fibers of a thermoplastic resin, and is distributed near the surface layer of the prepreg.

This production method keeps the prepreg of the present invention free from the problem, as occurs with parallel arranged fibers, that the component [C] invades the component [A]. The component [C] is distributed near the surface layer of the prepreg, but does not cover the entire surface like a interleaf film, so it can be easily impregnated with the matrix resin, to exhibit the tackiness and drapability of the matrix resin as the properties of the prepreg, and so render the prepreg excellent in handling convenience. Furthermore, the component [C] acts to keep a certain quantity of resin on the surface of the prepreg, to improve the tackiness compared to ordinary prepregs, and to keep the temporal change of tackiness very small.

The component [C] is made of a thermoplastic resin. A typical thermoplastic resin for the component [C] has bonds selected from carbon-carbon bonds, amide bonds, imide bonds, ester bonds, ether bonds, carbonate bonds, urethane bonds, thioether bonds, sulfone bonds, imidazole bonds and carbonyl bonds at the main chain. In particular, polyamides, polycarbonates, polyacetals, polyphenylene oxide, polyphenylene sulfide, polyarylates, polyacrylonitrile, polyesters, polyamidoimides, polyimides, polyether imides, polysulfones, polyether sulfones, polyether ether ketones, polyaramid and polybenzimidazole are excellent in impact resistance and suitable as materials for knit used in the present invention. Among them, polyamides, polyimides, polyamidoimides, polyether imides, polyether sulfones and polysulfones are high in toughness and good in heat resistance, and are very suitable for the present invention. The toughness of polyamides is especially excellent, and they are also very suitable for the present invention. The component [C] is obtained by means of hitting monofilament yarns, multifilament yarns and spun yarns, which are made of resin described as above, using a knitting machine.

The yarns used here maybe made of multicomponent fibers, which are obtained by means of spinning a plurality of thermoplastic resins, or may be blended yarns, which are obtained by means of spinning a plurality of fibers made from different thermoplastic resins. These methods are preferable since the properties of the composite material can be improved by using an optimum combination of thermoplastic resins.

Any of weft-knitted fabrics, which have a structure such as plain stitch, rib stitch and purl stitch, and any of warp-knitted fabrics, which have a structure such as tricot stitch, can be used. Furthermore, loops of the knitted fabrics may be fixed by means of heat adhesion after knitting it.

The component [C] must be distributed near the surface layer of the prepreg. In this case, when the prepreg has been processed into a composite material, the component [C] is localized between layers, thereby presenting a composite material excellent in impact resistance. The distribution near the surface layer means that more than 90% of the component [C] exists in a region from the surface of the prepreg to 30% of the thickness of the prepreg. When, as is preferred, more than 90% of the component [C] exists in a region from the surface of the prepreg to 20% of the thickness of the prepreg, the effect of the present invention can be exhibited more remarkably.

If a large amount of the component [C] exists deep inside, remote from a surface layer which is not in conformity with the above condition, the inter-layer energy absorption is insufficient, so that the effect of improving the composite material in its impact resistance and inter-layer toughness is reduced, and furthermore, since the arrangement of the reinforcing fibers is disturbed to lower the percentage of the matrix resin near the reinforcing fibers, the composite material may be degraded in strength and heat resistance.

If, as is preferred, the component [C] is similarly locally distributed on both sides of the prepreg, layers of the prepreg can be freely laminated without paying attention to which side is obverse or reverse when the composite material is produced. However, if two layers of a prepreg with the component similarly distributed only on one side are laminated together with the component [C] kept between the two layers of the prepreg, the same effect can be achieved. Accordingly, the prepreg with the component [C] distributed only on one side is also within the present invention.

The distribution of the component [C] in the prepreg can be evaluated as follows.

At first a prepreg is held in close contact between two smooth support plates, and gradually heated over a long period of time, to be cured. It is essential in this case that gelation should be achieved at a temperature as low as possible. If the temperature is raised suddenly before gelation is achieved, the resin in the prepreg flows, and the correct distribution in the prepreg cannot be evaluated. After completion of gelation, the prepreg is gradually heated, taking further time, to be cured. The cured prepreg is cut, and the cross section is photographed at a magnification of 200 times or more onto a size of 200 mm×200 mm or more. If it is difficult to discriminate between the components [B] and [C], one of them should be selectively dyed for observation. Either an optical microscope or an electron microscope, whichever is suitable, can be used.

The microphotograph is used to obtain the average thickness of the prepreg at first. The average thickness of the prepreg is obtained by taking measurements at five optional points on the photograph, and averaging the values. Subsequently, lines are drawn in parallel to the face direction of the prepreg at depths of 30% prepreg thicknesses from the surfaces in contact with both the support plates. The areas of the component [C] existing between the surface in contact with the support plate and the 30% parallel line on both sides are determined, and the total area of the component [C] existing in the overall width of the prepreg is determined. The ratio between the determined values is calculated as the rate of the component [C] existing within 30% depths from the surfaces of the prepreg. The area determination can also be effected by weight method or image processing using an image analyzer. To eliminate the effect of partial dispersion in the distribution, this evaluation should be effected over the entire width of the photo obtained, at five or more optional points on the photo, for averaging the values.

To obtain a composite material higher in impact resistance, it is preferable that the elastic modulus and yield strength of the material of the component [C] be lower than those of the cured resin of the component [B]. However, on the other hand, if the elastic modulus of the material of the component [C] be low like an elastomer, the component [C] is liable to be deformed during molding due to variations in conditions such as pressure, temperature and heating rate, so that the thickness of the inter-layer region of the laminate fluctuates, and as a result, the composite material becomes unstable in its physical properties. Accordingly, to achieve a stable high toughness unsusceptible to the variations of molding conditions, it is preferable that the elastic modulus of the material forming the component [C] is in a range from 80 to 400 kg/mm$^2$.

A suitable amount of the component [C] is 2 to 30 wt % based on the total weight of the components [B] and [C] in the prepreg or composite material. If the amount is less than 2 wt %, the intended effect of fine particles can be little exhibited, and if more than 30 wt %, the prepreg is greatly degraded in tackiness and drapability.

When the component [C] is used for enhancing the inter-layer toughness of the composite material due to its high rupture elongation and high toughness, while the rigidity of the component [B] is used for providing the compressive strength of the composite material, it is recommended that the amount of the component [C] be present in a rather smaller amount in a range from 2 to 20 wt %, more preferably 4 to 13 wt %.

The prepreg described as above can be prepared by the following methods.

(Method 1) The component [C] is bonded onto both sides or one side of the component [A] impregnated with the component [B], to form a prepreg. On bonding, it is desirable to heat and press the surfaces, to effect impregnation of the component [C] with the component [B]. By this step, the component [C] is exposed on the surfaces of the prepreg to present sufficient tackiness. As another version of this method, the component [C] can be impregnated with the component [B] beforehand.

(Method 2)

The component [B] formed as a film on a base such as release paper, the component [C] and the component [A] are bonded in that order spatially. Here, the temporal sequence of bonding is at will. And then, it is desirable to heat and press the surfaces, to form a prepreg.

In this method, a prepreg, where the component [C] is existed in one side of it, is obtained.

In this method, the component [B], the component [C] and the component [A] must be bonded in that order spatially, but other layers can be bonded in addition.

For example, in the case of producing a prepreg, where the component [C] is existed in one side of it, impregnation on both sides of the prepreg, where the component [B], [C], [A] and [B] are bonded in that order spatially, can be accomplished.

And, in the case of producing a prepreg, where the component [C] is existed in both sides of it, impregnation on one side of the prepreg, where the component [B], [C], [A] and [C] are bonded in that order spatially, or impregnation on both sides of the prepreg, where the component [B], [C], [A], [C] and [B] are bonded in that order spatially, can be accomplished.

The present invention is described below in more detail with reference to examples.

PRESENT INVENTION EXAMPLE 1

A knitted fabric (plain stitch) was made of nylon 66 multifilaments (15-denier, seven filaments) using a single-cylinder hitting machine (Konishi Kikai Seisakusho, MODEL CR-B). The areal weight of the knitted fabric was 6.5 g/m$^2$.

The following raw materials were kneaded to prepare a matrix resin composition.

(1) Tetraglycidyl diaminodiphenylmethane (ELM434 produced by Sumitomo Chemical Co., Ltd.) 60 parts by weight (2) Bisphenol A type epoxy resin (Epikote 828 produced by Yuka Shell Epoxy K.K. ) 20 parts by weight (3) Tri-functional aminophenol type epoxy resin (ELM100 produced by Sumitomo Chemical Co., Ltd.) 20 parts by weight (4) 4,4'-diaminodiphenylsulfone (Sumicure S produced by Sumitomo Chemical Co., Ltd.) 47.3 parts by weight (5) Polyether sulfone (PES5003P produced by Mitsui Toatsu Chemicals, Inc.) 16 parts by weight An intermediate product was prepared by impregnating the carbon fibers (T800H produced by Toray Industries, Inc.) with the matrix resin using the drum winding method. The areal weight of the carbon fibers was 190 g/m$^2$ and the areal weight of the matrix resin was 90.6 g/m$^2$.

The knitted fabric made of nylon 66 fibers, described as above, was bonded on both sides of the intermediate product, to prepare a prepreg.

Twenty four layers of the prepreg were laminated in quasi-isotropic configuration $(+45°/0°/-45°/90°)_{3S}$ and treated in an autoclave at 180° C. at a pressure of 6 kg/cm$^2$ for 2 hours. The cured board obtained was cut into 150 mm×100 mm test pieces. A drop impact of 1500 inch.Pound/inch was applied to the center of each test piece, and the compressive strength measured according to ASTM D 695 after impact was found to be 35.1 kg/mm$^2$.

PRESENT INVENTION EXAMPLE 2

A knitted fabric (plain stitch) was made of nylon 6 multifilaments (15-denier, seven filaments) using a single-cylinder knitting machine (Konishi Kikai Seisakusho, MODEL CR-B). The areal weight of the knitted fabric was 6.5 g/m$^2$.

An intermediate product was prepared by impregnating carbon fibers (T800H produced by Toray Industries, Inc.) with the same matrix resin as used in Present Invention Example 1 using the drum winding method. The areal weight of the carbon fibers was 190 g/m$^2$, and the areal weight of the matrix resin was 90.6 g/m$^2$.

The knitted fabric made of nylon 6 fibers, described as above, was bonded on both sides of the intermediate product, to prepare a prepreg.

From the prepreg, a cured board was prepared as in Present Invention Example 1, and with a drop impact applied, the compressive strength was measured and found to be 34.5 kg/mm$^2$.

PRESENT INVENTION EXAMPLE 3

Release paper was coated with the same matrix resin composition as used in Present Invention Example 1 by 45.3 g/m$^2$ using a reverse roll coater.

The resin film was fixed on a drum winder, the same knitted fabric made of nylon 66 as used in Present Invention Example 1 was bonded on it, and carbon fibers (T800H produced by Toray Industries, Inc.) were wound around it, and then the knitted fabric made of nylon 66 and the resin film were bonded on it in that order, to prepare a prepreg. The areal weight of the carbon fibers was 270 g/m$^2$ From the prepreg, a cured board was prepared as in Present Invention Example 1, and with a drop impact applied, the compressive strength was measured and found to be 34.8 kg/mm$^2$.

Comparative Example 1

Carbon fibers (T800H produced by Toray Industries, Inc.) were impregnated with the same matrix resin as used in Present Invention Example 1, to prepare a prepreg not containing the thermoplastic resin fibers using the drum winding method. The areal weight of the carbon fibers was 190 g/m$^2$ and the areal weight of the matrix resin was 103.6 g/m$^2$.

From the prepreg, a cured board was prepared as in Present Invention Example 1, and with a drop impact applied, the compressive strength was measured and found to be 19.7 kg/mm$^2$.

What is claimed is:

1. A prepreg having opposing surfaces and an overall thickness, comprising long reinforcing fibers of at least 5 cm in length, matrix resin and a knitted fabric made from thermoplastic resin fibers, with the knitted fabric distributed near either or both of the opposing surfaces such that more than 90% of the knitted fabric is no more than 30% of the overall thickness of the prepreg from an opposing surface.

2. A prepreg, according to claim 1, wherein thermoplastic resin used to form said thermoplastic resin fibers is one or more thermoplastic resins selected from the group consisting of polyamides, polycarbonates, polyacetals, polyphenylene oxide, polyphenylene sulfide, polyarylates, polyesters, polyamidoimides, polyimides, polyether imides, polysulfones, polyether sulfones, polyether ether ketones, polyaramids and polybenzimidazoles.

3. A prepreg, according to claim 1, wherein thermoplastic resin used to form said thermoplastic resin fibers is 80 to 400 kg/mm$^2$ in elastic modulus.

4. A prepreg, according to any of claims 1 to 3, wherein the matrix resin is a thermosetting resin.

5. A prepreg, according to claim 4, wherein the thermosetting resin is one or more selected from the group consisting of epoxy resins, maleimide resins, bismaleimide triazine resins, thermosetting polyimide resins with reactive groups at terminals, resins with acetylene terminals, resins with nadic acid terminals, resins with cyanate terminals, resins with vinyl terminals, resins with allyl terminals, phenol resins, resorcinol resin, unsaturated polyester resins, diallyl phthalate resin, urea resin and melamine resin.

6. A prepreg, according to any of claim 1 to 3, wherein the following formula holds:

$$2 \leq C \times 100/(C+B) \leq 30$$

where B is the weight of the matrix resin per unit area of the prepreg (g/m$^2$) and C is the weight of the knitted fabric made from thermoplastic resin fibers per unit area of the prepreg (g/m$^2$).

7. A prepreg, according to claim 4, wherein the following formula holds:

$$2 \leq C \times 100/(C+B) \leq 30$$

where B is the weight of the matrix resin per unit area of the prepreg (g/m$^2$) and C is the weight of the knitted fabric made from thermoplastic resin fibers per unit area of the prepreg (g/m$^2$).

8. A prepreg, according to claim 5, wherein the following formula holds:

$$2 \leq C \times 100/(C+B) \leq 30$$

where B is the weight of the matrix resin per unit area of the prepreg (g/m$^2$) and C is the weight of the knitted fabric made from thermoplastic resin fibers per unit area of the prepreg (g/m$^2$).

* * * * *